March 21, 1950     L. G. HAMILTON     2,501,274
TIME CONTROL DEVICE
Filed Nov. 20, 1947     4 Sheets-Sheet 1
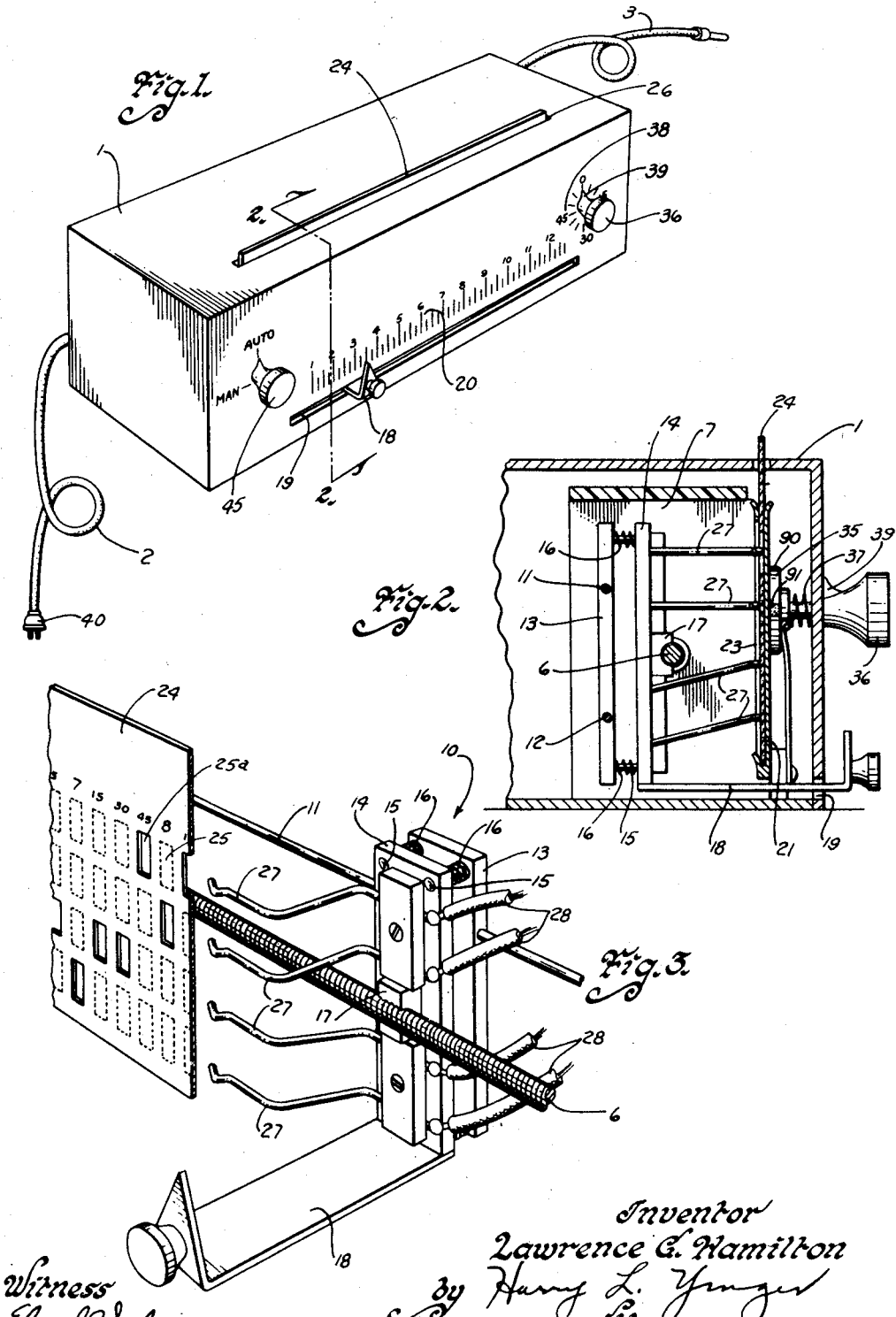
Inventor
Lawrence G. Hamilton
by Harry L. Yunger
Attorney
Witness
Edward P. Seeley March 21, 1950 — L. G. HAMILTON — 2,501,274
TIME CONTROL DEVICE
Filed Nov. 20, 1947 — 4 Sheets-Sheet 2

Witness
Edward P. Leeby

Inventor
Lawrence G. Hamilton
by Harry L. Younger
Attorney

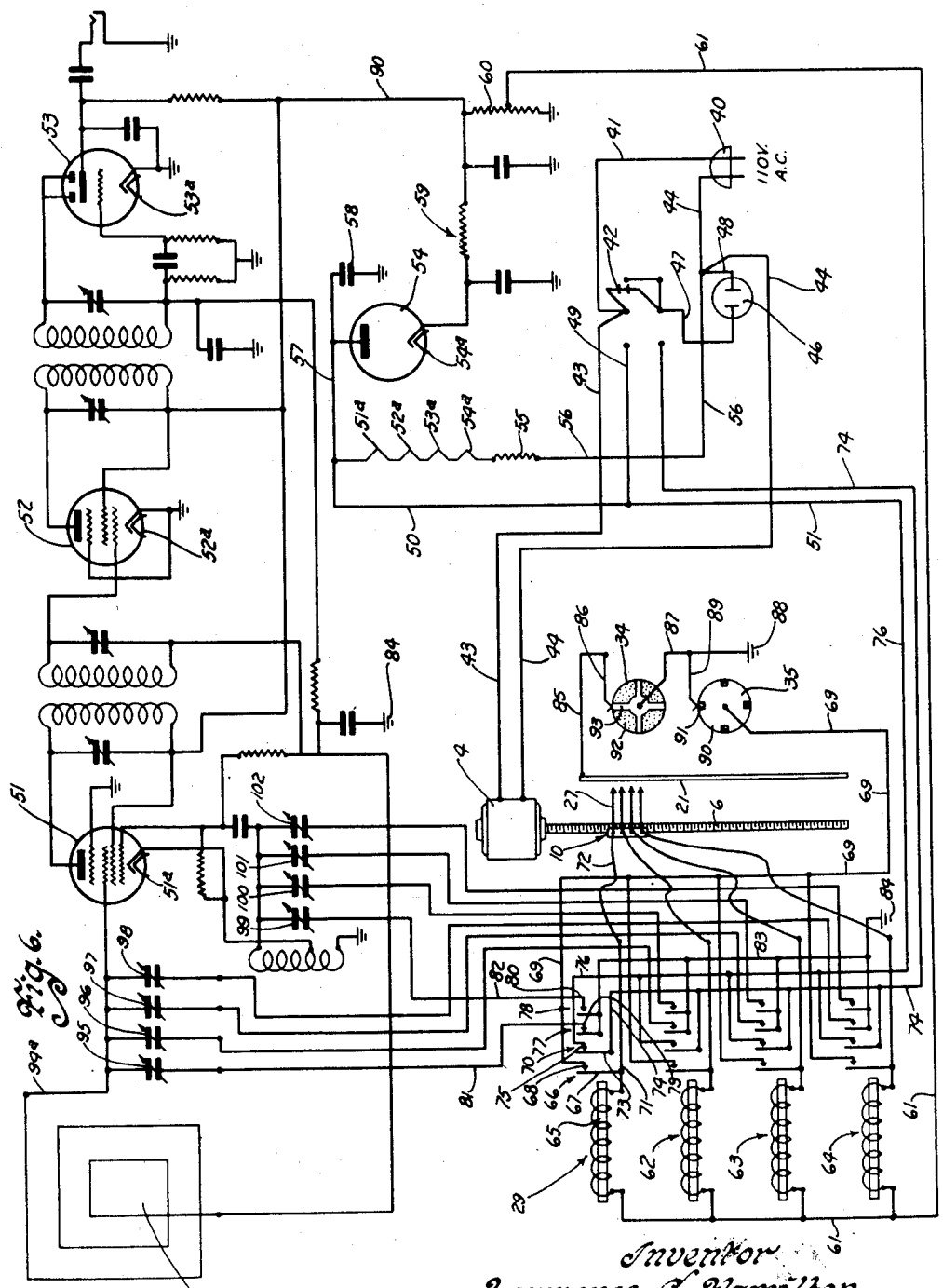

March 21, 1950     L. G. HAMILTON     2,501,274
TIME CONTROL DEVICE
Filed Nov. 20, 1947     4 Sheets-Sheet 4
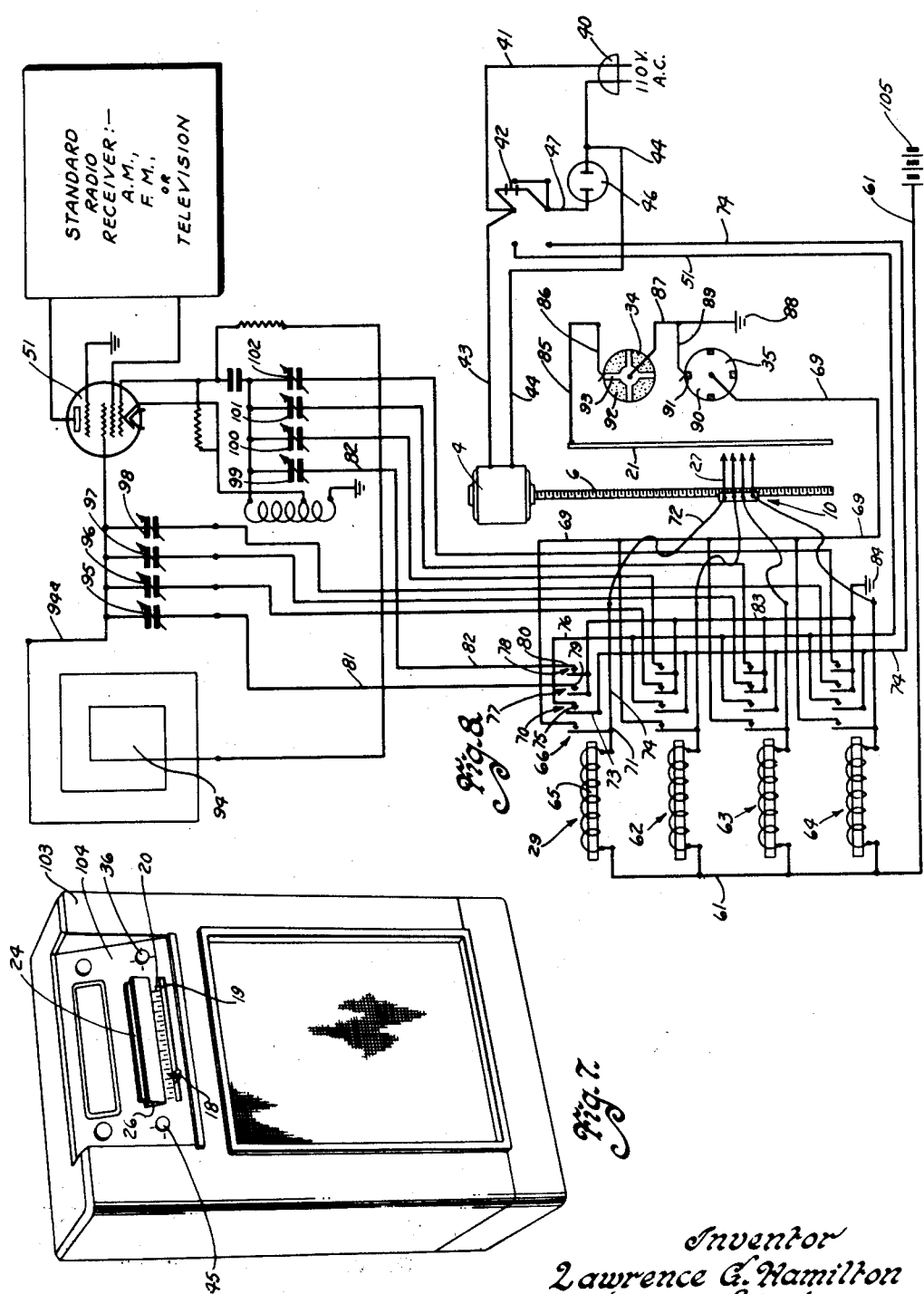
Inventor
Lawrence G. Hamilton
by Harry L. Younger
Attorney Patented Mar. 21, 1950

2,501,274

UNITED STATES PATENT OFFICE 2,501,274

TIME CONTROL DEVICE

Lawrence G. Hamilton, Des Moines, Iowa

Application November 20, 1947, Serial No. 787,241

8 Claims. (Cl. 161—1)

The present invention relates to a time control device to open or close an electric circuit and having the electric circuit remain open or closed for any desired time and as one use to which the time control device may be placed, it is shown as controlling a radio receiving set.

It is an object of the invention to provide a time control device to control one or a plurality of electric circuits for a time interval or any number of time intervals desired.

It is a further object of the invention to provide a time control device to control one or a plurality of electric circuits for a time interval or any number of time intervals desired; by a member divided into a plurality of series of time intervals; said member associated with the electric circuit or circuits so that any time interval of any series of time intervals selected from the member may close any electric circuit desired and if a time interval is not selected the electric circuit will remain open.

It is a still further object of the invention to provide a time control device to control one or a plurality of electric circuits for a time interval or any number of time intervals which time control device is adjustable so it may be set to start for any time desired.

It is a still further object of the invention to provide a time control device that is simple in construction and operation and economical both in construction and operation; long lasting and durable in operation, requiring less repair and lost time in operation; simple of design and easy of repair in case of breakdown; requires no special skill on the part of an operator to attach to an electrical circuit or circuits for operation; a device easy to operate by a user; and a device economically priced.

It is a still further object of the invention, as one means of use for the time control device, to attach the time control device to a radio receiving set, the time control device being a separate member attached to the radio or built into the radio receiving set, to turn on the radio receiving set and tune the radio receiving set to a desired station wherein the selection of programs and radio stations may be made over a period of time without need of touching the radio receiving set for the period of time.

With the foregoing and other objects in view, the invention will be more fully described herewith and will be particularly pointed out in the claims appended hereto.

In the drawings, wherein like symbols refer to like or corresponding parts throughout the several views:

Figure 1 is an elevational view of the time control device as a separate unit.

Figure 2 is a sectional view taken on the line 2—2 of Figure 1.

Figure 3 is an elevational view with parts of the time control device broken away to show several of the working parts of the time control device.

Figure 6 is a wiring diagram of the structure of Figure 4 illustrating how the time control device is connected to turn on a radio receiving set and into the tuning means of a radio receiving set.

Figure 7 is an elevational view of a console radio receiving set with the time control device built into the console radio receiving set.

Figure 8 is a wiring diagram illustrating how the time control device may be built into a radio receiving set and become a part thereof.

Figures 4, 5:
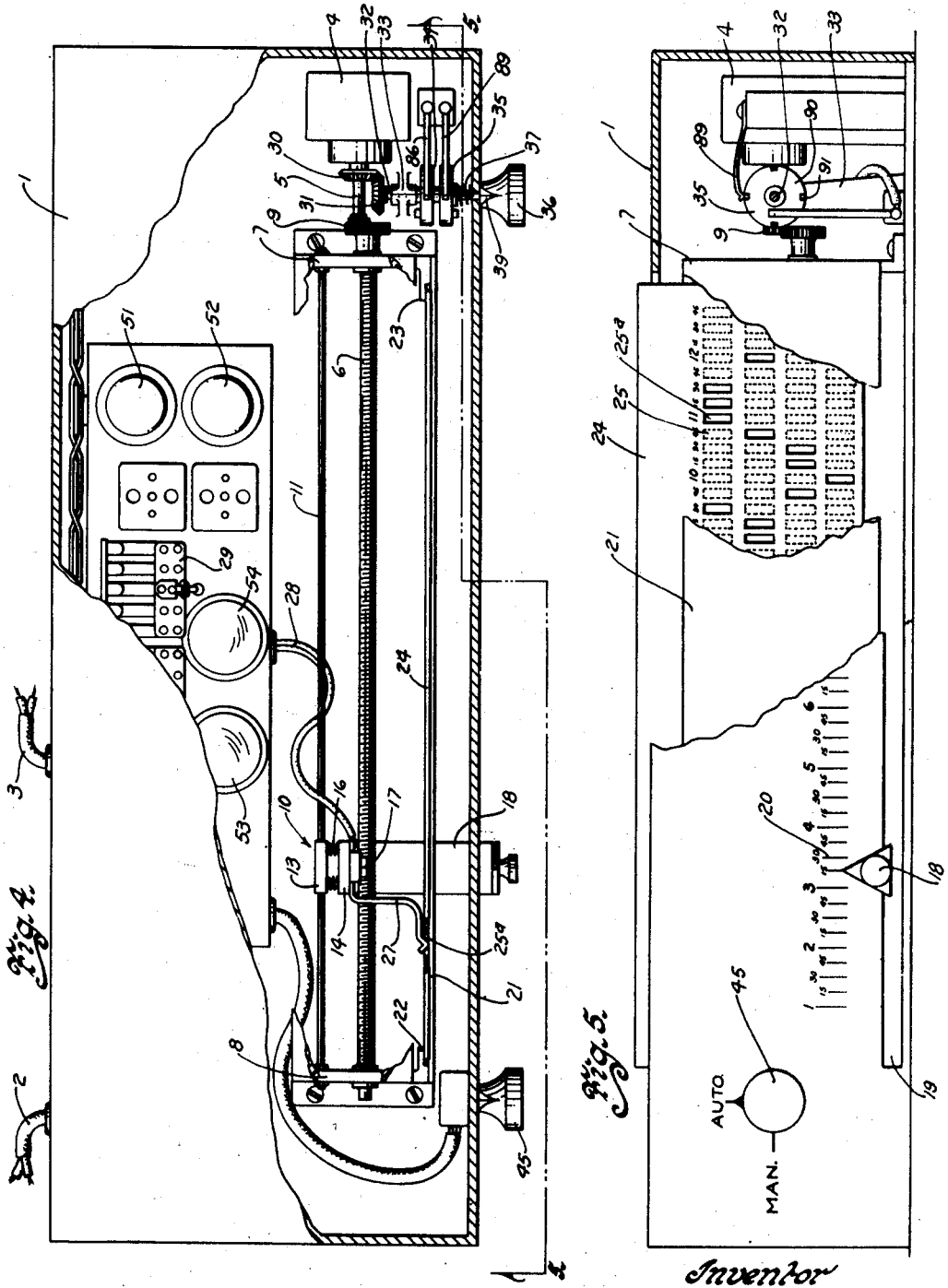
Figure 4 is a plan view of the interior of the time control device with the top broken away and showing the time control device as having some units of a radio receiving set incorporated with the time control device.
Figure 5 is a front elevation view of the time control device with portions of the front broken away.

The time control device is represented in Figure 1 as being encased in a cabinet 1 which may be of wood, resin or any other well known material for this purpose. An electrical conductor 2 attaches into the time control device and an electrical conductor 3 leaves the time control device to connect with audio means and a speaker unit where the time control device is connected with a portion of a radio receiving set or the time control device could connect to a number of window light electric circuits; in fact the present structure can be attached to most any electrical circuit to open or close the circuit at specific times.

The time control device, now referring to Figures 4 and 5 has a time mechanism 4, which may be in the form of an electric clock motor with the electric motor calibrated so that the electric motor shaft 5 makes one revolution per minute, a gear 6 is rotatably mounted in support members 7 and 8 at each end of gear 6. There are suitable bearings (not shown) between the support members 7 and 8 and the gear 6 and the gear 6 is rotated by the shaft 5 from the electric motor in time mechanism 4. A reduction gearing 9 between the gear 6 and electric motor shaft 5 reduces the speed of gear 6, three to one, hence the speed of gear 6 is one revolution every three minutes.

Means in the form of a carrier 10, best shown in Figure 3, rides on the gear 6 and is advanced along the gear 6 by the rotation of gear 6. The carrier 10, as presently shown, is made to travel one-twentieth of an inch each revolution of the gear 6 which will require twenty revolutions of gear 6 to move the carrier 10 one inch.

Two guide runners 11 and 12 are spaced vertically from each other and their ends are attached to support members 7 and 8. The guide runners 11 and 12 receive a back plate 13 of the carrier 10 and form a support for the carrier 10. The back plate 13 is drilled from edge to edge to present openings into which the guide runners 11 and 12 enter and the back plate 13 and carrier 10 are movable back and forth on the guide runners 11 and 12.

A front plate 14 is a part of carrier 10 and is spaced from back plate 13. The two plates 13 and 14 are attached together by bolts 15 at each corner of the plates 13 and 14 with springs 16 surrounding each bolt and holding the plates 13 and 14 separated. The plate 14 is movable toward the plate 13 when a pressure is applied to the plate 14 to compress springs 16. A half-nut 17 is attached to the front plate 14 and meshes with the gear 6. The carrier 10 is advanced on the guide runners 11 and 12 by the half-nut 17 meshing and advancing on gear 6.

A pointer 18 extends forwardly from the carrier 10 and projects through a slit 19 in the front of the cabinet 1 and a calibrated scale 20, in quarter hours, is printed on the front of the cabinet 1 which scale 20 indicates the movement of carrier 10 on the gear 6. If the pointer 18 is moved inwardly, the half-nut 17 will be disengaged from the gear 6 by the force on the front plate 14 compressing springs 16 and allowing front plate 14 to move rearwardly on bolts 15. With the pointer 18 still pushed inwardly, the pointer 18 can be moved from right to left or left to right, which will move the carrier 10 along the guide runners 11 and 12 to any position desired as determined by the scale 20.

A plate 21 attaches to the end supports 7 and 8 and extends along the entire length of the gear 6. The plate 21 is made of a metal material and is an electrical conductor. The metal plate 21 has side portions 22 and 23 to form a slot to receive a member 24 divided into a series of time intervals. The member 24 may be a card member and may be made up to care for any period of time desired. As shown for illustrative purposes, the card 24 is made for a twelve hour period and the scale 20 is made to correspond to the card 24.

The card 24 as can best be seen from Figure 5 is scored into rectangular blocks 25 with each block 25 representing a time interval and the blocks 25 scored in the present instance to correspond to a fifteen minute period. In other words the card 24 is so made as to correspond with scale 20 on the front of the cabinet 1. The card 24 is shown with four lines of blocks 25 hence the present card 24 is adapted to control four different electric circuits. The card 24, as previously stated, is made to control electric circuits for twelve hours, hence to set the time control device into operation for a twelve hour period the card 24 must be set for the time intervals it is desired for one electric circuit or any of the four electric circuits it is desired to have open or closed. If it is desired that any electric circuit remain open for any time interval then the blocks 25 are not punched from the card 24. If it is desired that any electric circuit be closed, then block 25 is punched from card 24 leaving an opening 25a in the card for that time interval.

After the card 24 has been properly prepared for a twelve hour period, the card 24 is entered into the time control device through a slot 26, in the top of the cabinet 1. The card 24 is received between the members 22 and 23 and guided into the position shown in Figure 5 in back of plate 21. With the card 24 in place, the pointer 18 is pushed in, the half-nut 17 disengaged from the gear 6 and the carrier 10 moved to the left until the pointer 18 is just opposite (1) on the scale 20. The card 24 is now in position to control the time control device for a period of twelve hours.

The card 24 is guided into position between side portions 22 and 23 and finally comes to rest in the position shown in Figure 5. The carrier 10 has attached thereto a series of spring fingers 27 which ride across the card 24 as the carrier 10 advances on the gear 6. The spring finger 27, or fingers 27, enter the opening 25a where block 25 has been punched out and contact the metal plate 21. Metal plate 21 being a conductor, electric current will flow through spring fingers 27, through conductors 28 attached to carrier 10 and spring fingers 27, with the conductors 28 running to a series of relays, one of which is shown at 29 (Figure 4) and to be described later with regard to the wiring diagram of Figure 6. The relay 29 is actuated to close an electric circuit for the particular time interval having an opening 25a in the card 24.

If any block 25 has not been punched from card 24, so as to leave an opening 25a, the card 24 will serve as an insulator or non-conductor, and no contact will be made between the spring fingers 27 and plate 21. Hence when the electric circuit to be controlled is desired to be open for any time interval, block 25 for that time interval is not punched from card 24 and the block acts as an insulator between spring fingers 27 and plate 21 and will not allow an electric circuit to be established.

Referring to Figure 4, the motor shaft 5 has a bevel gear 30 mounted thereon and rotatable with the shaft 5. The bevel gear 30 meshes with a second bevel gear 31 on the end of a shaft 32 journaled in a support 33. The shaft 32 has attached thereto and rotatable therewith two ring members 34 and 35. The first ring 34 is an impulse ring and the second ring 35 is a holding ring. The shaft 32 continues through the cabinet 1 and terminates in a knob 36. A spring 37 surrounds the shaft 32 between the holding ring 35 and cabinet 1 and exerts its pressure to hold the bevel gears 30 and 31 in mesh. To turn the rings 34 and 35 to adjust the rings 34 and 35 with the scale 38 on the front of the cabinet 1, the knob 36 is pulled outwardly compressing spring 37 and pulling bevel gear 31 away from the bevel gear 30 and shaft 32 is rotated until the pointer 39 on knob 36 points to the proper place on scale 38. The shaft 32 cannot be turned against the clock motor of time mechanism 4, hence it is necessary to disengage gears 30 and 31 to properly adjust rings 34 and 35.

In the operation of the time control device, it is thought the operation of the structure can be best understood by referring to the wiring diagram of Figure 6 along with the previous figures just described. The conductor cord 2 is first plugged into an electrical outlet to supply electric current to the time control device and the electric circuits to be actuated. For the purpose of illustration, the time control device is shown connected into a radio receiving set which radio receiving set comprises a tuning unit, detecting unit and power supply unit in the time control device cabinet 1 connected into a separate audio amplifier and speaker unit. A plug 40 on the end of the conductor 2 enters an outlet and conducts electric current by a line 41 to a switch 42. The line 41 is extended through the line 43 to the clock motor of the time mechanism 4, so that regardless of whether switch 42 is open or closed electric current will always flow to the clock motor of time mechanism 4. A return conductor 44 provides a ground from the clock motor of time mechanism 4 to the plug 40.

The switch 42 is controlled from the front panel of the cabinet 1 by knob 45. If it is desired to operate the radio receiving set without the time control device, the knob 45 is turned to the left or "man" for manual operation of the radio receiving set. The radio receiving set is then just supplied electric current through the time control device. The plug on the conductor leading to a separate audio amplifier and speaker unit (not shown) may be plugged into socket 46 in the time control device hence electric current would flow through switch 42, to conductor 47, socket 46, conductor 48 and thence to ground conductor 44 and through plug 40 to complete the electric circuit. When the knob 45 is turned upwardly to "Auto" the switch 42 is thrown to the left and the time control device is now operably connected with the radio receiving set.

In the wiring diagram of Figure 6, and the top plan view of Figure 4, the time control device is shown as connected into portions of a radio receiving set with conductor 3 running to an audio amplifier and speaker unit (not shown). It is noted that the radio receiving set portions shown in Figures 4 and 6 may be included along with the audio features and a speaker in a separate radio receiving set and the time control device may be a separate member entirely. In the structure of Figures 4 and 6, the tuning unit, detecting unit and power supply unit are shown in conjunction with the time control mechanism within the same cabinet 1 as an illustration of one combination of the time control mechanism in a radio receiving circuit. If a separate time control member only is made, the whole radio receiving set would plug into socket 46.

Electric current flows from conductor 41 through switch 42 to conductor 49. From the conductor 49, the electric current flows to a conductor 50 on the right and a conductor 51 on the left. Tracing first the flow of electric current to the conductor 50, the electric current flows to tube heaters of tubes 51, 52, 53 and 54 of the radio receiving set to heat the tubes 51, 52, 53 and 54. This electric circuit is shown schematically with the tube heaters represented at 51a, 52a, 53a and 54a and connected to conductor 50. There will be a voltage drop of 12½ v., 12½ v., 12½ v. and 35 v. through the tube heaters 51a, 52a, 53a and 54a with the resistor 55 completing the voltage drop to 110 v. Conductor 56 connects to ground conductor 44 to complete the circuit. Electric current flows to the tube heaters 51a, 52a, 53a and 54a at all times when a portion of the radio receiving set is included with the tune control mechanism as in Figures 4 and 6.

Conductor 57 connects into the half wave rectifier tube 54, known in the art as a 35Z5 tube. Electric current flowing to this tube 54 is 117 v. A. C. and from the cathode of the tube 54, after a rectification within tube 54 flows 117 v. D. C. electric current. The condenser 58 to the right by-passes to ground some of electrical interference coming on the A. C. line while the two condenser-resistor unit 59 smooths the pulsations from the D. C. current to make a pure D. C. current. The D. C. current then flows to the voltage divider 60 which is adjustable and is adjusted to allow 24 v. D. C. current to flow to the conductor 61. The conductor 61 connects into relays 29, 62, 63 and 64. The relays 29, 62, 63 and 64 just happen to be operable on 24 v. D. C. current hence the A. C. current must be changed to D. C. and reduced in voltage. Any type of relay 29, 62, 63 and 64 may be employed, but for economical reasons this particular type relay was employed. The members 54, 59 and 60 could be eliminated from the structure if a relay operated on 110 v. A. C. current were employed. With the present 24 v. relays, electric current must always be available in conductor 61, hence electric current must always be supplied to conductor 50.

Each of the four relays are the same, so only relay 29 will be explained in detail. An electromagnet 65 is included in each relay and each relay includes four electric switches. The first or top switch 66 has one side 67 of the switch connecting with conductor 61 through electro-magnet 65 while the other side 68 of the switch 66 connects by conductor 69 with the holding ring 35. The side 67 of the switch 66 connects by conductor 71 through a second conductor 72 with the top spring finger 27 on the carrier 10. The second switch 70 has one side 73 of the switch 70 connected to conductor 74 which conductor 74 connects through the switch 42.

The other side 75 of the switch 70 connects through conductor 76 with the conductor 51. After the return electric current passes through switch 42, it goes through conductor 47 to socket 46 and through the audio amplifier and speaker unit plugged into socket 46. The conductor 3 is plugged into the audio section of the second radio receiving set and the switch 70 when closed allows electric current to pass to and turn on the audio amplifier and speaker unit. After passing through the audio amplifier and speaker unit, the circuit is completed through conductors 48 and 44. The third and fourth switches 77 and 78 have sides 79 and 80 both connecting to conductors 81 and 82. The conductors 81 and 82 connect into tuning means in the radio circuit of the radio receiving set (to be later described) and complete an electric circuit through switches 77 and 78 and conductor 83 to a suitable ground 84.

In operation of the time control device and in combination with a radio receiving set, the card 24 as shown in Figure 5 is made up to function for a twelve hour period. The card 24 can be made with one row of blanks 25 or as many as desired. In the present instance, the card 24 is shown with four rows of blanks, hence control may be exercised over four separate electric circuits or with a radio receiving set, control may be exercised over four different broadcasting stations.

The radio programs for a day or for a 24 hour period are available in all local newspapers hence if a radio listener wishes to select what he cares to listen to in advance, he can take the radio program in the newspaper and his card 24 and select the programs desired. The present card 24 is for twelve hours, hence in selecting the program, some time must be assigned to the first hour on the card. For instance, if the selector wanted the programs to start at 10:00 a. m. the first hour on the card 24 would then be from 10:00 a. m. to 11:00 a. m. and the twelve hour period would end at 10:00 p. m. as can be seen from the card 24 in Figure 3, the blanks 25 represent a fifteen minute period and the blanks 25 must be punched from the card leaving an opening 25a in order for the time control device to function. The four rows of blanks 25 will represent four different broadcasting stations, hence the selector goes along the radio program, selecting the program and station for the particular time interval that he desires. If he wishes the radio receiving set to be silent, no selection is made for that time interval. It is necessary in the beginning, that the selector get the card 24 into the time control device somewhere close to the hour that the card is punched to start, carrying through the present example, at 10:00 a. m. The card 24 is now ready to be inserted into slot 26 in the top of the cabinet 1.

The pointer 18 is moved inwardly, as previously explained, to free half nut 17 from gear 6 and the carrier 19 is moved to the left until pointer 18 points to (1) on the scale 20. The knob 36 is also turned to zero on the scale 38 and the card 24 is entered into slot 26 and the time control device is ready to function.

The carrier 19 is now advanced to the right on gear 6 and can travel in a twelve hour period to the right end of gear 6. When the carrier 19 has traveled a sufficient distance on gear 6, that a twelve hour period has elapsed, the gear 6 may be made smooth and of a smaller diameter than the gear 6 so the carrier will slip as the gear 6 rotates and not be forced further to the right; or an electric switch connecting into the electric circuit flowing to the clock motor of the time mechanism 4 can be placed where the switch would be held in open position as long as the carrier 19 was at the end of its travel on gear 6, hence stopping the motor of time mechanism 4 and rotation of gear 6.

With the card 24 in place in back of conductor plate 21, the spring fingers 27 connected on carrier 19 ride over the card 24 as the carrier 19 advances on the gear 6. The gear 6 is rotated to advance the carrier 19 the distance of four time intervals or blanks 25 on the card 24 every hour. If say the first time interval or blank 25 is punched from the first row on the card 24, it will represent the first time interval or 10:00 a. m. to 10:15 a. m. and will be the radio station represented by the first row of time intervals. The top spring finger 27 will enter the opening 25a in the card 24 and contact the plate 21. This closes an electric circuit through conductor 61, to electromagnet 65 of the relay 29. It is noted that relay 62 will operate when an opening 25a occurs in the second row of time intervals on card 24; relay 63 will operate when an opening 25a occurs in the third row of time intervals on card 24; and relay 64 will operate when an opening 25a occurs in the fourth row of time intervals on card 24. The electro-magnet 65 of relay 29 will be energized thus closing switches 66, 70, 77 and 78.

The closing of switch 66 will complete the electric circuit through electro-magnet 65 to conductors 71 and 72, spring finger 27, plate 21, conductor 85, spring finger 86, impulse ring 34 and conductor 87 to a suitable ground 88 from the side 67 of switch 66. From the side 68 of the switch 66, electric current flow is through conductor 69 to holding ring 35, spring finger 89 and thence through conductor 87 to ground 88. Thus it can be seen that spring fingers 27 entering openings 25a in the card 24 close an electric circuit through electro-magnet 65 of relay 29 which relay closes all switches 66, 70, 77 and 78. The switch 70 being closed, electric current will flow from conductors 51 and 76 to the side 75 of switch 70, side 73 of switch 70, conductors 73 and 74, switch 42, conductor 47, socket 46 and thus through the audio amplifier and speaker unit. Electric current will always flow through conductors 56 and 57 to tube 54, unit 59, conductor 90 and thence to the tuning mechanism (to be later explained) within the portions of radio receiving set within cabinet 1. Conductor 81 runs from the tuning mechanism to switch 77 and conductor 82 runs from the tuning mechanism to switch 78 from where both switches 77 and 78 connect to conductor 83 which runs to ground 84.

It can thus be seen that spring fingers 27 contacting plate 21 close an electric circuit to ground that energizes electro-magnet 65 to close switches 66, 70, 77 and 78. Switch 66 closes an electric circuit to holding ring 35, the function of which will be presently described. The timing of the radio receiving set is dependent upon the row of time intervals for which the time interval or blank 25 is punched. The electric circuit through the timing mechanism is completed through switches 77 and 78 to ground 88.

The function of the holding ring 35 and impulse ring 34 will now be explained. The rings 34 and 35 are of exactly the same size and are calibrated on shaft 32 to make one complete revolution every hour. Carrying through on the previous example, at 10:15 a. m. or the end of the first time interval selected, it is necessary to open the switches 66, 70, 77 and 78 of relay 29 because for the next time interval of 10:15 a. m. to 10:30 a. m. another broadcasting station may have been selected. Hence, instead of measuring the time interval by the opening 25a in the card 24, the time interval is measured by the holding ring 35.

The holding ring 35 is divided into quadrants and as the ring 35 rotates a conductor spring finger 89 contacts the outer periphery of ring 35. The outer periphery of each quadrant will represent a fifteen minute time interval, with the major portion 90 on the outer periphery of each quadrant being of a conductor material and a smaller portion 91 on the outer periphery of each quadrant being a non-conductor material. The ring 35 is so calibrated that the beginning of the conductor portion 90 of each quadrant occurs at the beginning of each time interval namely; 10:00 a. m., 10:15 a. m., 10:30 a. m., etc. The non-conductor portion 91 of each quadrant occurs at the end of each time interval. The non-conductor portion 91 of each quadrant may be of a length that will represent 1 to 15 seconds. The impulse ring 34 is divided into quadrants also, each representing a fifteen minute time interval, with the major portion 92 on the outer periphery of each quadrant being a non-conductor material and a smaller portion 93 on the outer periphery of each quadrant being a conductor material. The rings 34 and 35 are attached to the same shaft 32 and rotate together. The rings 34 and 35 are so mounted with respect to each other on shaft 32 that the beginning of conductor portion 90 on ring 35 and the beginning of conductor portion 93 on ring 34, each contact spring fingers 89 and 86 respectively, at the beginning of each time interval.

In operation, it will be noted that electric current will flow to the impulse ring 34 when any one of the spring fingers 27 encounter an opening 25a in the card 24, to allow spring finger 27 to contact plate 21. Current will flow through the electro-magnet 65, conductors 71 and 72, spring finger 27, plate 21, conductor 85, spring finger 86, conductor portion 93 in ring 34 to conductor 87 thence to ground 88. Electric current would also flow through spring finger 89 to the holding ring 35. When current flows through electromagnet 65, it is energized and switches 66, 70, 77 and 78 become closed. Electric current now flows from the side 68 of switch 66 to conductor 69 which leads to the holding ring 35.

As the rings 34 and 35 rotate and near the end of the time interval, the spring finger 86 is riding on the non-conductor peripherial portion 92 of the impulse ring 34. When the non-conductor portion 91 of the holding ring contacts the spring finger 89, it is noted that the spring finger 86 is also contacting the non-conductor portion 92 on the outer periphery of the impulse ring 34. As previously stated, the rings 34 and 35 have been so mounted that the non-conductor portions 92 and 91 on the rings 34 and 35 coincide for a period of 1 to 15 seconds.

When both spring fingers 86 and 89 are contacting the non-conductor portions 92 and 91 of the rings 34 and 35, the electric circuit through the electro-magnet 65, conductors 71 and 72, spring finger 27, plate 21, conductor 85 to spring finger 86 is broken. The electric circuit through switch 66, formed when electro-magnet 65 is energized by the previous circuit being closed, is through conductor 71, switch 66, conductor 69 to holding ring 35, spring finger 89, conductor 87 and thence to ground 88. This circuit is broken because spring finger 89 is now contacting a nonconductor 91 hence the electro-magnet 65 will become deenergized and the switches 66, 70, 77 and 78 will be allowed to open. This will be the situation at the end of each time interval.

As the rings 34 and 35 continue rotating they will come to the beginning of a new time interval and simultaneously the spring finger 86 will contact one of the conductor portions 93 on the impulse ring 34 and the spring finger 89 will also contact one of the conductor portions 90 on the holding ring 35. The conductor portions 93 on the outer periphery of the impulse ring 34 extend a distance equivalent to the distance around the periphery of the holding ring 35 of the non-conductor portions 91; or in time equivalent, 1 to 15 seconds. At the beginning of each time interval then, the spring fingers 86 and 89 each contact conductor portions on the rings 34 and 35. Electric current cannot flow to the holding ring 35 through conductor 69 until the switch 66 is closed. The switch 66 is closed when the electric circuit through the impulse ring 34 is closed. Therefore at the beginning of each time interval, the spring finger 86 riding on a conductor portion 93 of the ring 34, allows the electromagnet 65 to become energized, thus closing the switch 66. Immediately electric current flows through conductor 69, holding ring 35, spring finger 89 to conductor 87 and ground 88. This allows electric current to flow from electromagnet 65 and through switch 66 and thus keeps electromagnet 65 energized. Since the spring finger 86 rides on the conductor portion 93 of impulse ring 34 for a limited time, the spring finger 86 soon rides on the non-conductor portion 92 and the electric circuit through electro-magnet 65 and impulse ring 34 is broken. It is then that the electric circuit through the holding ring 35 is established and the electromagnet 65 is held energized and holds the switch 66 closed. When the spring finger 89 starts riding on the non-conductor portion 91 of holding ring 35 at the end of the time interval, the spring finger 86 is also riding on the non-conductor portion 92 of impulse ring 34. Both electric circuits from the electro-magnet 65 through impulse ring 34 and holding ring 35 are now broken and the electro-magnet 65 deenergized. The switches 66, 70, 77 and 78 now open. This break is made in order that one of the spring fingers 27 may enter an opening 25a in another row of blanks 25 on the card 24 for the next time interval, and have a new relay 62, 63 or 64 actuated.

The rings 34 and 35 may be turned to the beginning of any of the four time intervals by turning knob 36. The knob 36 is turned to adjust the rings 34 and 35 to the proper time interval to co-ordinate the rings 34 and 35 with the card 24 when inserting the card 24 into the time control device.

In Figure 6, the portion of the radio circuit shown is the standard superheterodyne radio circuit common and now in use in most radios offered for sale. The radio circuit will be described briefly to show how the present time control means fits into a radio circuit. It is thought that the plugging into the socket 46 of the electric conductor from the radio receiving set has been explained sufficiently heretofore and a thorough understanding of how 110 v. D. C. current gets to the radio circuit when the radio circuit operates.

A loop antenna is shown at 94 and connects by conductor 94a into a signal input tube or converter tube 51, representing any one of a plurality of signal receiving and amplifying tubes to which is connected tuning means in the form of condensers 95, 96, 97 and 98 and condensers 99, 100, 101 and 102. The condensers 99, 100, 101 and 102 are connected with a local oscillator circuit to tube 51.

The condensers 95, 96, 97 and 98; and condensers 99, 100, 101 and 102 are tuned to the frequencies of the four broadcasting stations as represented on the card 24. The cards 24 will care for a given locality or city and will be set up for the broadcasting stations nearest to the user or the broadcasting stations representing the main network of stations. The card 24 may be made for any number of broadcasting stations desired, being merely a problem of adding sufficient tuning condensers and relays.

The condensers 95 and 99 are tuned for the same broadcasting station and are connected by conductors 81 and 82 to the relay 29, the operation of which electric circuit has been previously explained. The condensers 96 and 100 are tuned for the same station; connect to relay 62 and operate in the same manner as for the condensers 95 and 99. Condensers 97 and 101 are tuned for another station and are connected to relay 63 while condensers 98 and 102 are tuned for a fourth station and are connected to condenser 64. When the lower two switches in relays 29, 62, 63 and 64 are closed, a ground circuit through the tuning means is completed with the radio receiving set tuned to the desired station for any time interval.

Figure 7 shows the time control device built into a console radio cabinet 103 to make a single unit with the knobs 36 and 45 projecting through panel 104, scale 20 on panel 104 and pointer 18 extending through slot 19 in panel 104. A special slot 26 is placed in the panel 104 to receive the card 24 and all the structure previously described as comprising the time control device as incorporated within the console radio 103.

Figure 8 shows the wiring diagram of the radio receiving set of a console radio having the time control device incorporated along therewith. The supply of electric current to the relays 29, 62, 63 and 64 comes from source 105, to the conductor 61 and not from the voltage divider 60 as in Figure 6. The relays 29, 62, 53 and 64 are of course selected so as to be operable on the current supplied. The operation is similar in every respect to the operation previously described with the entire radio receiving circuit plugged into socket 46.

It will be understood that the invention has been described for purposes of illustration and explanation and that changes and variations are possible without departing from the scope of the invention; all such modifications and changes are intended to be included in the appended claims.

I claim:

1. A time control device for an electric circuit to a member to be actuated comprising a time mechanism in the form of an electric motor calibrated to rotate a shaft one complete revolution during a specified time interval, said motor shaft associated with a gear and rotating the gear, a carrier mounted on the gear and moved a calibrated distance with the passage of time, a card member divided into a series of time intervals, any of which intervals may be selected and punched from the card leaving an opening in the card, said card spaced from the carrier member and the card being between the carrier and a conductor connected into the electric circuit to a member to be actuated, means from the carrier member passing through the opening in the card and contacting the conductor behind the card to close the electric circuit to a member to be actuated through a relay, an impulse ring and thence to ground; said relay being energized to close a switch to connect the electric circuit into the member to be actuated and means to hold the relay switch closed for the time interval represented by the opening in the card.

2. A time control device for an electric circuit to a member to be actuated comprising a time mechanism in the form of an electric motor calibrated to rotate a shaft one complete revolution during a specified time interval, said motor shaft associated with a gear and rotating the gear, a carrier mounted on the gear and moved a calibrated distance with the passage of time, a card member divided into a series of time intervals, any of which intervals may be selected and punched from the card leaving an opening in the card, said card spaced from the carrier member and the card being between the carrier and a conductor connected into the electric circuit to a member to be actuated, means from the carrier member passing through the opening in the card and contacting the conductor behind the card to close the electric circuit to a member to be actuated through a relay, an impulse ring and thence to ground; said relay being energized to close a switch to connect the electric circuit into the member to be actuated and a holding ring through which electric current flows after electric current no longer flows through the impulse ring to hold the relay switch closed for the time interval represented by the opening in the card.

3. A time control device for an electric circuit to a member to be actuated comprising a time mechanism in the form of an electric motor calibrated to rotate a shaft one complete revolution during a specified time interval, said motor shaft associated with a gear and rotating the gear, a carrier mounted on the gear and moved a calibrated distance with the passage of time, a card member divided into a series of time intervals, any of which intervals may be selected and punched from the card leaving an opening in the card, said card spaced from the carrier member and the card being between the carrier and a conductor connected into the electric circuit to a member to be actuated, means from the carrier member passing through the opening in the card and contacting the conductor behind the card to close the electric circuit to the member to be actuated through a relay, an impulse ring and thence to ground; said relay being energized to close a switch to connect the electric circuit into the member to be actuated, said impulse ring being calibrated to close the electric circuit to the member to be actuated for a limited time at the beginning of each time interval and a holding ring through which electric current flows after the electric current no longer flows through the impulse ring to hold the relay switch closed for the time interval represented by the opening in the card.

4. A time control device for an electric circuit to a member to be actuated comprising a time mechanism in the form of an electric motor calibrated to rotate a shaft one complete revolution during a specified time interval, said motor shaft associated with a gear and rotating the gear, a carrier mounted on the gear and moved a calibrated distance with the passage of time, a card member divided into a series of time intervals, any of which intervals may be selected and punched from the card leaving an opening in the card, said card spaced from the carrier member and the card being between the carrier and a conductor connected into the electric circuit to a member to be actuated, means from the carrier member passing through the opening in the card and contacting the conductor behind the card to close the electric circuit to the member to be actuated through a relay, an impulse ring and thence to ground; said relay being energized to close a switch to connect the electric circuit into the member to be actuated, said impulse ring being calibrated to close the electric circuit to the member to be actuated for a limited time at the beginning of each time interval by a limited portion on the outer periphery of the impulse ring being a conductor portion at the beginning of each time interval and a holding ring through which electric current flows after the electric current no longer flows through the impulse ring to hold the relay switch closed for the time interval represented by the opening in the card by a limited portion on the outer periphery of the holding ring being a non-conductor at the end of each time interval.

5. A time control device for an electric circuit to a member to be actuated comprising a time mechanism in the form of an electric motor calibrated to rotate a shaft one complete revolution during a specified time interval, said motor shaft associated with a gear and rotating the gear, a carrier mounted on the gear and moved a calibrated distance with the passage of time, a card member divided into a series of time intervals, any of which intervals may be selected and punched from the card leaving an opening in the card, said card spaced from the carrier member and the card being between the carrier and a conductor connected into the electric circuit to a member to be actuated, means from the carrier member passing through the opening in the card and contacting the conductor behind the card to close the electric circuit to the member to be actuated through a relay, an impulse ring and thence to ground; said relay being energized to close a switch to connect the electric circuit into the member to be actuated, said impulse ring being calibrated to close the electric circuit to the member to be actuated for a limited time at the beginning of each time interval by a limited portion on the outer periphery of the impulse ring being a conductor portion at the beginning of each time interval with the remainder of the periphery of the impulse ring for each time interval being a non-conductor, a holding ring through which electric current flows after the electric current no longer flows through the impulse ring to hold the relay switch closed for the time interval represented by the opening in the card by a limited portion on the outer periphery of the holding ring being a non-conductor at the end of each time interval with the remainder of the periphery of the impulse ring for each time interval being a conductor, a spring finger electrically connected to the conductor back of the card and to ground, riding around the outer periphery of the impulse ring and a spring finger riding around the outer periphery of the holding ring, electrically connected to the electric circuit from the relay and establishing the electric circuit through the holding ring to ground.

6. A time control device for an electric circuit to a member to be actuated comprising a time mechanism in the form of an electric motor calibrated to rotate a shaft one complete revolution during a specified time interval, said motor shaft associated with a gear and rotating the gear, a carrier mounted on the gear and moved a calibrated distance with the passage of time, a card member divided into a series of time intervals, any of which intervals may be selected and punched from the card leaving an opening in the card, said card spaced from the carrier member and the card being between the carrier and a conductor connected into the electric circuit to a member to be actuated, means from the carrier member passing through the opening in the card and contacting the conductor behind the card to close the electric circuit to a member to be actuated through a relay, an impulse ring and thence to ground; said relay being energized to close a switch to connect the electric circuit into the member to be actuated; a holding ring through which electric current flows after electric current no longer flows through the impulse ring to hold the relay switch closed for the time interval represented by the opening in the card and said impulse ring and holding ring mounted on a common shaft with said common shaft rotatable from the time mechanism.

7. A time control device for an electric circuit to a member to be actuated comprising a time mechanism in the form of an electric motor calibrated to rotate a shaft one complete revolution during a specified time interval, said motor shaft associated with a gear and rotating the gear, a carrier mounted on the gear and moved a calibrated distance with the passage of time, a card member divided into a series of time intervals, any of which intervals may be selected and punched from the card leaving an opening in the card, said card spaced from the carrier member and the card being between the carrier and a conductor connected into the electric circuit to a member to be actuated, means from the carrier member passing through the opening in the card and contacting the conductor behind the card to close the electric circuit to the member to be actuated through a relay, an impulse ring and thence to ground; said relay being energized to close a switch to connect the electric circuit into the member to be actuated, said impulse ring being calibrated to close the electric circuit to the member to be actuated for a limited time at the beginning of each time interval, a holding ring through which electric current flows after the electric current no longer flows through the impulse ring to hold the relay switch closed for the time interval represented by the opening in the card, said impulse ring and holding ring mounted on a common shaft rotatable from the time mechanism and means to disconnect the common shaft from the time mechanism to adjust the impulse ring and holding ring to the beginning of a time interval.

8. A time control device for an electric circuit to a member to be actuated comprising, a time mechanism calibrated to the passage of time, a carrier means associated with and movable by the time mechanism a calibrated distance with the passage of time, a card member divided into a series of time intervals, any of which time intervals may be selected and punched from the card leaving an opening in the card, a conductor connected into the electric circuit to the member to be actuated, means from the carrier member passing through the opening in the card and contacting said conductor to close the electric circuit to said member to be actuated through a relay, an impulse ring, and thence to ground, said relay being energized to close the switch to connect the electric circuit with the member to be actuated, and means to hold the relay switch closed for the time interval represented by the opening in the card.

LAWRENCE G. HAMILTON.

REFERENCES CITED

The following references are of record in the file of this patent:

UNITED STATES PATENTS

| Number | Name | Date |
| --- | --- | --- |
| 2,367,363 | Matt | Jan. 16, 1945 |